United States Patent Office 3,306,706
Patented Feb. 28, 1967

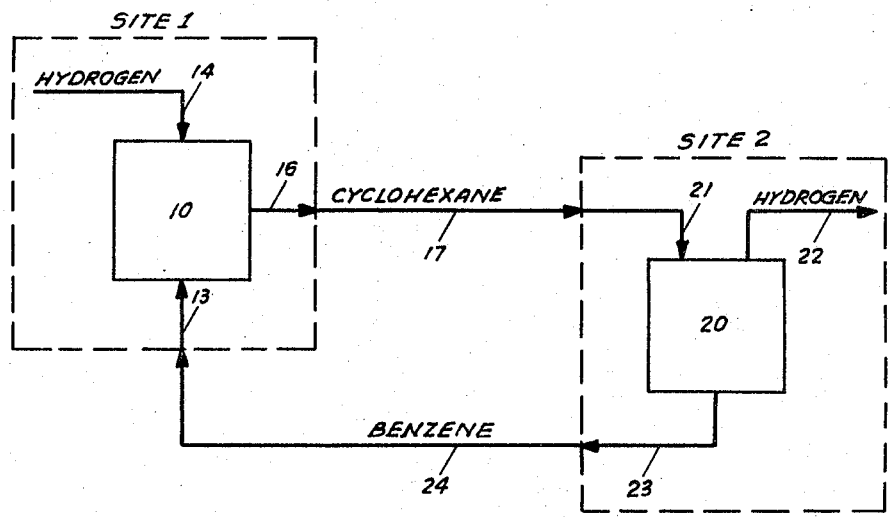
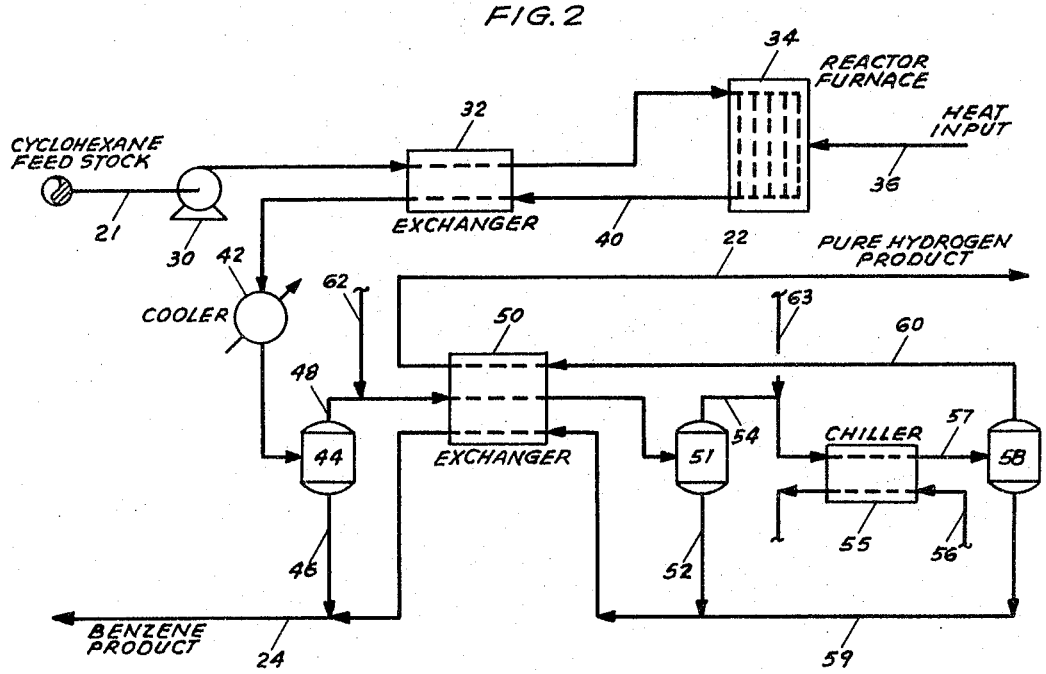

3,306,706
PROCESS FOR PRODUCING HYDROGEN AND HYDROGEN CARRIER THEREFOR
Seymour C. Schuman, Princeton, N.J., assignor to Hydrocarbon Research, Inc., New York, N.Y., a corporation of New Jersey
Filed Oct. 17, 1962, Ser. No. 231,247
8 Claims. (Cl. 23—212)

This invention relates to the transportation of hydrogen from one site to another. It also relates to a manner of storage of hydrogen in a liquid medium. It also relates to the production of hydrogen.

Conventional diesel powered submarines can operate below the surface for only a short time using energy stored in batteries. For many years, the submarine art has sought a new and more efficient source of energy for underwater operation, and until the advent of nuclear power, had met with no success. At the present time, submarines capable of operation below the surface with unlimited range, powered with nuclear engines, are extremely expensive and the art has sought, and continues to seek, other sources of energy which would permit the construction of submarines with intermediate submerged range far greater than that possible with storage batteries, and yet far less expensive than the nuclear powered submarines. The invention of the fuel cell as an electrical energy producing device has opened new possibilities in this field, and hydrogen as the primary source of this energy, in use with these fuel cells, shows great promise. However, the supply of hydrogen in the restrictive confines of a submarine, presents a considerable problem. The bulk weight of storage vessels, for reasonable quantities of hydrogen for this purpose, become excessive even at very high storage pressures for gaseous storage or very low temperatures for liquid storage. Therefore, the art has sought a method for producing hydrogen aboard the submarine itself while operating submerged and in secrecy from liquids which may be stored easily and safely.

For the production of relatively pure hydrogen, concurrent with its use in a submerged submarine, several commercial processes are possible and some have been proposed. Among the commercial processes for the production of hydrogen which may be applicable to this extremely restrictive environment are:

(1) The catalytic decomposition of ammonia or methyl-alcohol.

(2) The catalytic reforming with steam of light hydrocarbons, such as propane, butane or light petroleum naphtha.

(3) The partial oxidation with relatively pure oxygen of hydrocarbon liquids ranging from propane through fuel oil.

Each of these processes has inherent characteristics which make it less than ideal for this particular application. In the case of ammonia decomposition, the ammonia feedstock itself has a high vapor pressure and the fumes, if they should escape, are intolerable to personnel in a confined space. Furthermore, the hydrogen is produced in admixture with nitrogen, and the separation of the two, although not difficult commercially, presents a considerable difficulty in this application. Even after the separation is accomplished, the nitrogen cannot be disposed of without leaving a giveaway bubble trail on the surface of the sea. The decomposition of methyl-alcohol produces hydrogen in admixture with carbon monoxide, a poisonous gas. The separation of the carbon monoxide, or its shift by the water gas reaction and subsequent removal of large quantities of carbon dioxide, represent process complexities best avoided if possible. In both the steam reforming of light hydrocarbons and the partial oxidation of liquid hydrocarbons carbon monoxide again is produced and, in addition, sulfur compounds add to the difficulty. In these processes, as well as in the decomposition of methyl-alcohol, if the carbon monoxide shift is employed, large amounts of heat exchange surface, heat balance and steam balance all present problems. None of the above processes, as commercially employed, normally produces hydrogen of higher than about 95–97% purity and the extensive purification equipment employed is heavy, bulky, complex and costly. Furthermore, in these processes, absorbers, fractionators and scrubbers, and similar devices which are level sensitive are used and only with ingenious and complex designs, and at high cost, does it seem possible to provide such an apparatus aboard a submarine, which would permit it to operate with complete freedom as to its attitude while diving or surfacing, or would continue to operate while the submarine was being subjected to the action of the sea in pitching and rolling, or being subjected to explosive or missile launching shock. In these processes, extremes of temperature, either high or low, or both, may be employed necessitating the use of expensive alloy materials and heavy insulation which contribute to bulk and weight. Relatively high pressure is required, either for production or purification of the hydrogen, and this further increases weight and safety hazards. The complex purification trains required use corrosive, caustic or otherwise objectionable or dangerous chemicals. Because these processes are relatively complex and system holdup is high, they do not lend themselves readily to rapid changes in hydrogen production rate over a very wide range from idle to sprint requirements.

The principal object of this invention is to make available for use at a remote site hydrogen of high purity by transportation from a first site to a remote site, there to be stored until needed. Another and more particular object of the invention is to provide a system for the supply of hydrogen aboard a submarine which overcomes the objections and difficulties of the prior art.

My invention also has for its object the dehydrogenation of saturated or substantially saturated liquid hydrocarbons to produce controlled yields of hydrogen as in the environment of a submarine.

A further object of my invention is to provide an integrated process for conveying a hydrogen rich liquid to a point of use, dehydrogenating said liquid to produce pure hydrogen and a hydrogen-poor liquid which may be returned thereafter to the original site and rehydrogenated.

My invention also has for its object, the economical dehydrogenation of a liquid hydrogen carrier material whereby a minimum of apparatus is required, process variables are reduced, and the process can be carried out without special technical personnel, no poisonous or noxious gases are produced, no extraneous chemicals are required, and the equipment is not sensitive to the attitude of the craft.

My invention is more particularly shown and described in connection with the attached drawing illustrative thereof and in which:

FIGURE 1 is a schematic diagram of the intertransportation of a hydrogen carrier material.

FIGURE 2 is a schematic process flow diagram showing the dehydrogenation facilities by which the hydrogen carrier material can be effectively dehydrogenated for the supply of varying amounts of hydrogen.

As more particularly shown in FIGURE 1, the box 10 at Site 1 is the apparatus at a shore based installation, or on a submarine tender, or the submarine itself if provided with hydrogenation equipment, by which benzene introduced at 13 may be hydrogenated with hydrogen entering at 14 to produce cyclohexane in line 16 which is a preferred hydrogen carrier material.

The line 17 is intended to show the movement of cyclohexane from Site 1 to Site 2, such latter site, for example, being the point of use of the hydrogen as on a submarine. The line 17 thus schematically shows a means of conveying the liquid hydrogen carrier material, as for example, in the storage tanks of a submarine which will be filled with cyclohexane at Site 1 and transported to Site 2.

The box 20 at Site 2 represents the dehydrogenation apparatus, as aboard a submarine, which receives the hydrogen carrier material (cyclohexane) in line 21, and has as end products the hydrogen discharging at 22 and the hydrogen-poor carrier material discharging at 23. This hydrogen-poor carrier material may be returned by line 24 back to the benzene feed line 13 at Site 1 for hydrogenation. It will, of course, be understood that the hydrogen is to be converted into power by the fuel cell, the features of which are not important to this invention except that it requires hydrogen and oxygen at a rate depending upon the required energy of propulsion of the submarine which may vary from idle to sprint. The idle period requirements of such a cell are a fraction of the sprint conditions.

The process as shown in FIGURE 2 is primarily intended to schematically illustrate the dehydrogenation equipment particularly suitable for submarine purposes as suggested by box 20 of FIGURE 1. Cyclohexane feed stock entering the unit at 21 from storage tanks on the submarine first passes through a low pressure pump 30 and passes through a heat exchanger 32 in which it is substantially or completely vaporized and preheated for subsequent introduction into the catalytic reactor furnace 34. This furnace may include a number of tubes filled with a known dehydrogenating catalyst. Inasmuch as the dehydrogenation is an endothermic reaction, it is necessary to supply heat as indicated by 36. The dehydrogenation reaction will take place at approximately atmospheric pressure and at temperatures in the range of 500° to 900° F. depending on desired purity and conversion.

The reactor effluent discharges through the line 40 and gives off some of its heat to the incoming feed in heat exchanger 32. The effluent is further cooled in the heat exchanger 42, preferably by sea water. The cooled effluent then enters the separator tank 44 and at temperatures of about 100° F. more than 50% of the liquid if benzene, is removable through the line 46.

The remainder of the effluent then passes by line 48 through a second heat exchanger 50 wherein the temperature is further reduced and the condensed liquid is removed from separator tank 51 by line 52. The vapor passes by line 54 to the final heat exchanger or chiller 55.

While as much as 90% of the benzene may be condensed at temperatures of the order of 50° F. and at 0° F. approximately 97% of the benzene will be condensed and the hydrogen will have a purity of 99%, it may be necessary to go to temperatures in the order of —50° F. to condense out essentially all of the benzene and to yield pure hydrogen. On a submarine adapted to operate with a fuel cell, liquid oxygen will be available and this must be vaporized and warmed for use. Line 56 represents refrigeration available from such a source which is applied to the effluent stream 54 in the chiller 55 to reduce the temperature of the gas in line 57 to as low as —50° F. and condense essentially all of the remaining liquefiable material. This is removed from the separator tank 58 by line 59 and constitutes, with the liquid drawn off at 46 and 52 from separator tanks 44 and 51, the hydrogen-poor carrier material which is then returned by line 24 to the storage tanks on the submarine. Conveniently, the refrigerating value of the cold condensed liquids in line 59 may be used in heat exchanger 50. Similarly, the pure hydrogen in line 60 from the separator 58 can also be used in heat exchanger 50, on its way to line 22, to recover refrigeration.

As the final stage of cooling of the hydrogen carrier material is preferably below 40° F., a freezing point depressant such as petroleum naphtha, heptane, octane or nonane may be required depending upon the purity of the original feed stock and the conversion. This may be injected into the effluent along the cooling train as at 62 or 63. It is also possible, and may be preferable, to inject a small amount of the cyclohexane feed stock at these points as the freezing point depressant and in such case no other materials are required. Cyclohexane depresses the freezing point of benzene until the eutectic mixture of 75% cyclohexane and 25% of benzene with a freezing point of —54° F. is reached.

The hydrogenation of the benzene to make cyclohexane can be accomplished by commercially known methods and will be carried out at Site 1 at which there is an available supply of hydrogen. This may be shore based, a submarine tender or on a submarine itself.

The reversible and chemical reaction employed in this invention, which permits hydrogen to be loaded, so to speak, onto benzene and unloaded from it later, may be written as:

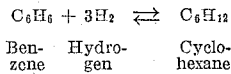

$$C_6H_6 + 3H_2 \rightleftarrows C_6H_{12}$$

Ben-    Hydro-    Cyclo-
zene     gen       hexane

Both the forward and reverse reactions are well known and are used commercially to produce cyclohexane from benzene and benzene from cyclohexane. The reaction from cyclohexane to benzene which produces the hydrogen is endothermic, and goes to virtual completion in the range of 650–700° F. at atmospheric pressure and in the presence of a suitable catalyst with the almost complete absence of side reactions. The reaction of benzene with hydrogen to form cyclohexane is exothermic, takes place at lower temperatures and higher pressures to virtual completion in the presence of a suitable catalyst. The reaction from cyclohexane to benzene is not known to be used commercially for the prime purpose of producing hydrogen, since hydrogen produced by this method would be far too expensive compared with that made by other processes in normal situations. However, for the particularly restrictive requirements for a hydrogen production process imposed by a submarine operating submerged and in secrecy, this method has particular merit. As previously mentioned, there are other saturated or substantially saturated cyclic hydrocarbons which will serve as hydrogen carriers substantially as well as cyclohexane. Cyclohexane yields 3 moles of hydrogen and methyl cyclohexane gives the same yield. Decalin yields 5 moles of hydrogen and tetralin yields 2 moles of hydrogen.

Advantages of this overall combination of processes lie in the fact that inexpensive hydrogen is supplied at a remote site, transported to the area of use in a safe, convenient manner and permits the use on board the submarine of a process and apparatus which have, in themselves, the following advantages over the other known processes of hydrogen production.

(1) The method is extremely simple in that only reaction temperature and refrigeration input require control for any given feed rate.

(2) Operation is so simple that probably no increase of submarine personnel is required. Otherwise normal complements of crew members should suffice.

(3) No extremes of temperature are employed and pressures are virtually atmospheric; thus the use of expensive alloys, high heat resistant materials, expensive and complicated valves and fittings and heavy insulation are avoided completely.

(4) High hydrogen purity is obtained without use of extensive purification systems, side reactions are absent, and the hydrogen need only be separated from the high boiling liquid by cooling to a moderately low temperature.

(5) The method provides maximum freedom from hazard.

(6) Inboard space and weight requirements are at a minimum.

(7) The process lends itself readily to turn down to idle and turn up to peak sprints simply by changing the feed rate, and heat and refrigeration inputs.

(8) The only gaseous product is hydrogen which is ultimately consumed and all liquids encountered in the process either as feed or product have low vapor pressures which may be handled and stored in essentially the manner of direct feed.

(9) A unit utilizing this process is insensitive to attitudes of the craft. There are no critical levels, no fractionating devices and no liquid phase separations involved. Pitch, roll, dive and surfacing attitudes have no effect on the operation.

(10) There is no material produced which is difficult to dispose of without revealing the position and movement of the submerged submarine.

(11) No extraneous chemicals are employed in the process.

(12) Moderate temperatures, low pressure, few moving parts, absence of corrosive materials, standard equipment and simplicity of operation all make for the highest degree of reliability.

While I have shown and described a preferred form of embodiment of my invention, I am aware that modifications may be made thereto and I desire a broad interpretation of the invention within the scope and spirit of the description herein and of the claims appended hereto.

I claim:

1. The process of dehydrogenation of cyclohexane to produce benzene and hydrogen which comprises contacting the cyclohexane with a suitable catalyst at substantially atmospheric pressure and below 1000° F. to release hydrogen, cooling and condensing the effluent to produce benzene and liquefiable constituents as a liquefied product and relatively pure hydrogen as a second product and returning the liquefied product to a rehydrogenation step, said cooling being accomplished to a temperature in the order of 0° F. to condense in the order of 97% of the benzene and produce hydrogen of about 99% purity.

2. The process of dehydrogenation as claimed in claim 1 wherein the dehydrogenation is accomplished on a submarine and the cooling is accomplished in part by heat exchange with sea water and in part by refrigeration to attain the desired temperature.

3. The process of dehydrogenation as claimed in claim 1 wherein the effluent is cooled to a temperature in the order of —50° F. to produce hydrogen of substantially 99.9% purity and condense substantially all of the benzene.

4. A cyclic process for economically supplying to a remote site, a source of substantially pure hydrogen which comprises:
    (a) hydrogenating an aromatic hydrocarbon from the class consisting of benzene, its homologs and derivatives to produce a cycloalkane carrier liquid;
    (b) transporting said carrier liquid to the remote site;
    (c) dehydrogenating, at said remote site, the carrier liquid in the presence of a suitable catalyst, at substantially atmospheric pressure, and temperatures below 1000° F. to provide an effluent of hydrogen and liquefiable constituents;
    (d) cooling said effluent to condense said liquefiable constituents;
    (e) separating from the liquefiable constituents the uncondensed vapors including hydrogen;
    (f) and returning the condensed constituents to a hydrogenation step for reuse in the process.

5. A cyclic process as claimed in claim 4 wherein the remote site is a fuel cell on a submarine, and the cooling of step (d) is accomplished in part with sea water and in part with refrigeration to produce hydrogen of not less than 99% purity.

6. A cyclic process as claimed in claim 5 wherein a small amount of the hydrocarbon feed is fed into the dehydrogenation step effluent prior to a stage of cooling.

7. A cyclic process as claimed in claim 4 wherein the aromatic hydrocarbon is benzene, the carrier liquid is cyclohexane, the cooling is accomplished in part with sea water, and in part with refrigeration to produce a hydrogen of substantially 99.9% purity.

8. A cyclic process as claimed in claim 5 wherein the carrier liquid is cooled in stages:
    (a) by heat exchange with fresh charge stock from the hydrogenation step;
    (b) by cooling with sea water;
    (c) by heat exchange with condensed liquid hydrocarbon and pure hydrogen;
    (d) by refrigeration from the vaporization of liquid oxygen, such oxygen being at least a part of that required to consume the hydrogen; and
    (e) wherein liquid is separated and removed from effluent after steps (b), (c) and (d).

References Cited by the Examiner

UNITED STATES PATENTS

| | | | |
|---|---|---|---|
| 2,827,504 | 3/1958 | Schmalenbach | 23—210 X |
| 3,111,387 | 11/1963 | Avery et al. | 23—212 |
| 3,179,500 | 4/1965 | Bowen et al. | 23—212 X |

OTHER REFERENCES

Egloff: "The Reactions of Pure Hydrocarbons," 1937 ed., pp. 674, 678. Reinhold Pub. Corp., N.Y.

"Organic Chem." by Degering, College Outline Series, 6th ed. (1959), pp. 172, 181. Barnes and Noble, Inc., N.Y.

OSCAR R. VERTIZ, *Primary Examiner.*

MAURICE A. BRINDISI, EDWARD STERN,
*Examiners.*